United States Patent
Cejka et al.

(10) Patent No.: US 11,544,870 B2
(45) Date of Patent: Jan. 3, 2023

(54) SYSTEM AND METHOD FOR VERIFICATION OF VEHICLE SERVICE TARGET POSITIONING

(71) Applicant: Hunter Engineering Company, Bridgeton, MO (US)

(72) Inventors: Brian M. Cejka, Des Peres, MO (US); Daniel R. Dorrance, Ballwin, MO (US); Asher L. Haggard, St. Louis, MO (US); Timothy A. Strege, Sunset Hills, MO (US); Charles P. Johannigmeier, Bethalto, IL (US)

(73) Assignee: HUNTER ENGINEERING COMPANY, St. Louis, MO (US)

( * ) Notice: Subject to any disclaimer, the term of this patent is extended or adjusted under 35 U.S.C. 154(b) by 0 days.

(21) Appl. No.: 17/208,858

(22) Filed: Mar. 22, 2021

(65) Prior Publication Data
US 2021/0209794 A1 Jul. 8, 2021

Related U.S. Application Data

(63) Continuation-in-part of application No. 16/538,245, filed on Aug. 12, 2019, now Pat. No. 11,145,084.

(60) Provisional application No. 62/994,672, filed on Mar. 25, 2020, provisional application No. 62/725,023, filed on Aug. 30, 2018.

(51) Int. Cl.
*G06T 7/73* (2017.01)
*H04N 5/232* (2006.01)

(52) U.S. Cl.
CPC ............ *G06T 7/74* (2017.01); *H04N 5/23299* (2018.08); *G06T 2207/30248* (2013.01)

(58) Field of Classification Search
CPC ............ G06T 7/74; G06T 2207/30248; G06T 2207/30204; G06T 7/73; H04N 5/23299; H04N 5/247; H04N 5/2257; G03B 17/561; G03B 43/00; G01S 7/4026; G01S 7/4086; G01S 7/4972; G01S 2013/93271; F16M 11/24; F16M 11/42; F16M 11/123
See application file for complete search history.

(56) References Cited

U.S. PATENT DOCUMENTS

| | | | |
|---|---|---|---|
| 7,177,740 B1 | 2/2007 | Guangjun et al. | |
| 7,424,387 B1* | 9/2008 | Gill | G01B 11/272 33/288 |
| 2005/0096807 A1 | 5/2005 | Murray et al. | |
| 2013/0110314 A1* | 5/2013 | Stieff | G01B 11/275 701/1 |
| 2015/0317780 A1 | 11/2015 | Dumont et al. | |
| 2016/0291160 A1 | 10/2016 | Zweigle et al. | |
| 2016/0327383 A1* | 11/2016 | Becker | G01B 11/005 |

(Continued)

*Primary Examiner* — Nasim N Nirjhar
(74) *Attorney, Agent, or Firm* — Sandberg Phoenix & von Gontard PC

(57) ABSTRACT

A machine-vision vehicle service system, and methods of operation, incorporating at least one at least one camera and an optical projector for guiding placement of vehicle service components relative to a vehicle undergoing service. The camera and optical projector are operatively coupled to a processing system configured with software instructions to selectively control a projection axis orientation for the optical projector to enable projection of visible indicia onto various surfaces visible within the field of view of the camera.

20 Claims, 9 Drawing Sheets

(56) References Cited

U.S. PATENT DOCUMENTS

2018/0104825 A1 4/2018 Vulcano et al.
2020/0001414 A1 1/2020 Wen

\* cited by examiner

SYSTEM AND METHOD FOR VERIFICATION OF VEHICLE SERVICE TARGET POSITIONING

CROSS-REFERENCE TO RELATED APPLICATIONS

The present application is a continuation-in-part of co-pending U.S. patent application Ser. No. 16/538,245 filed on Aug. 12, 2019, which is related to, and claims priority from, U.S. Provisional Patent Application Ser. No. 62/725,023 filed on Aug. 30, 2018. The present application further claims priority to U.S. Provisional Patent Application Ser. No. 62/994,672 filed on Mar. 25, 2020. Each of the aforementioned applications are herein incorporated by reference.

STATEMENT REGARDING FEDERALLY SPONSORED RESEARCH

Not Applicable.

BACKGROUND OF THE INVENTION

The present application is related to a fixture for facilitating the calibration and alignment of vehicle safety system sensors, and in particular, to a fixture for facilitating and verifying proper placement of targets or fixtures in proximity to a vehicle for use while inspecting or servicing a safety system sensor of the vehicle.

Vehicle wheel measurement systems, including wheel alignment or inspection systems employing machine vision technology such as cameras to observe optical targets mounted on various surfaces within associated fields of view, are well known. These systems employ cameras mounted to a fixture or structure commonly located in front of a vehicle service area. The cameras are oriented such that each wheel (or wheel target) of a vehicle within the service area is visible to at least one of the cameras. The structure supporting the cameras may be either fixed in place, or may be mobile for repositioning from one service area to another as needed. Vertical (and/or rotational) adjustable of the cameras accommodates vehicles at different elevations on a lift rack within the vehicle service area. Images acquired by the cameras are conveyed to a processing system configured with suitable software instructions for identifying observed surfaces (such as target), for determining spatial measurements associated with the observed surfaces, and for identifying vehicle wheel alignment angles from the determined spatial measurements.

When it is necessary to realign or recalibrate various ADAS sensors, such as radar units or optical sensors, specialized targets or fixtures are precisely positioned in proximity to the vehicle, often with the aid of a vehicle measurement system such as a wheel alignment or inspection system. For example, U.S. Pat. No. 7,382,913 B2 to Dorrance describes a method and apparatus for guiding placement of a vehicle service apparatus relative to a vehicle, based on measurements acquired by a separate vehicle wheel alignment measurement system. Other techniques for guiding placement of a specialized structure relative to a vehicle undergoing a realignment or recalibration of a vehicle safety system sensor include the use of laser emitters and leveling devices, such as shown in U.S. Pat. No. 6,583,868 B2 to Hopfenmuller.

Positionable fixtures or support structures capable of supporting both the cameras associated with a vehicle measurement system as well as targets required for realignment or recalibration of onboard vehicle safety system sensor, such as shown in U.S. Pat. No. 10,634,488 B2 to Stieff et al. have been developed, thereby reducing the total number of fixtures required to complete a vehicle onboard sensor realignment or recalibration, and eliminating potential spatial conflicts between support structures and targets or fixtures.

Some targets or fixtures used in the alignment or calibration of onboard vehicle safety system sensors are necessarily independent of the vehicle measurement system due to their required placements relative to the vehicle. When utilizing such targets or fixtures, an operator is provided with guidance to place the targets or fixtures relative to either the vehicle undergoing service or to the vehicle measurement system. Such guidance can take the form of specific instructions directing the operator to locate a placement location using manual measurement techniques, or may be in the form of visual aids such as laser spots or lines guiding the operator to the placement location.

In order to continue the alignment or calibration of the onboard vehicle safety system sensor, the processing system assumes that the operator has correctly followed the provided guidance for proper placement of the necessary independent targets or fixtures. If the operator fails to properly follow the provided guidance, or fails to do so with sufficient accuracy, the resulting align or calibration of the onboard vehicle safety system sensor may fail completely or may lead to poor performance by the onboard vehicle safety system sensor.

Accordingly, it would be advantageous to provide a system and method for verifying that the operator has correctly followed guidance for proper placement of the independent targets or fixtures. It would be further advantageous to provide a system and method capable of determining how accurately an operator has placed the targets or fixtures. An additional benefit includes a capacity to generate a record of the verified placement accuracy for association with the vehicle service records, warranty approvals, and subsequent vehicle service audits.

BRIEF SUMMARY OF THE INVENTION

Briefly stated, the present disclosure sets forth a fixture supporting a set of cameras associated with a vehicle measurement system, together with at least one optical projection system configured to project visible indicia, such as points or lines, onto surfaces in proximity to the fixture to guide relative placement of vehicle service components. A camera support structure locates the set of vehicle measurement cameras in a vertically-adjustable, spaced arrangement to view features or objects within a vehicle service area. The optical projection system is carried by the camera support structure, and is operatively coupled to a processing system configured with software instructions to selectively control the optical projection system about one or more axes of rotation, enabling projection of visible indicia onto surfaces at selected locations within the vehicle service area. The processing system is further configured with software instructions to evaluate images acquired from, but not limited to, the supported set of vehicle measurement cameras, to identify features present within the images, including targets and the projected visible indicia. The processing system utilizes the identified features to determine and record spatial relationships, such as between a vehicle, observed targets, and/or projected visible indicia.

In a further configuration of the present disclosure, one or more placement camera systems, disposed either independently from the fixture, or on the fixture but separate from the vehicle measurement cameras, are operatively coupled to the processing system. The placement camera systems may be portable, or mounted at fixed locations in the vehicle service area or on the fixture, with adjustable and/or orientable fields of view configured to encompass portions of the vehicle service area to acquire images including the targets and projected visible indicia for evaluation by the processing system.

In a method of the present disclosure, proper placement of vehicle service fixtures relative to a vehicle undergoing service or inspection can be verified by: (1) establishing a location of the vehicle within a reference frame; (2) identifying a placement location for the vehicle service fixture relative to the vehicle within the frame of reference; (3) directing an operator to position the vehicle service fixture at the identified placement location; (4) acquiring an image of the identified placement location with a camera (including optionally orienting the camera to view the identified placement location); and (5) evaluating the acquired image to identify a presence or an absence of the service fixture.

In another method of the present disclosure, proper placement of vehicle service fixtures relative to a vehicle undergoing service or inspection is verified after positioning of the fixture by an operator. The method requires: (1) orienting a projection axis of an optical projection system towards an expected location of a target associated with a vehicle service fixture and projecting a visible indicia, such as a point or line, onto said target; (2) acquiring an image of the vehicle service fixture target; (3) evaluating the acquired image to identify a presence or an absence of the projected visible indicia on the target; and (4) responsive to an identified presence of the projected visible indicia, evaluating a relative spatial relationship between the projected visible indicia and an origin point on the target. The evaluated relative spatial relationship may optionally be either stored in association with a vehicle service record, or presented as feedback to an operator.

A further method of the present disclosure sets forth a procedure for verifying calibration of an optical projector associated with a vehicle inspection system. Initially, an observable target surface is disposed within a field of view of a camera system for the vehicle inspection system. Images of the target surface acquired by the camera system are processed to establish a spatial relationship between the target surface and the vehicle inspection system. From the established spatial relationship, an orientation of an ideal projection axis for an optical projection system of the vehicle inspection system is calculated for projecting a visible indicia onto a reference point on the target surface. The optical projection system is directed to align with the calculated projection axis, and activated to project a visible indicia towards the reference point. Images of the illuminated target surface are acquired by the camera system, and evaluated to compare an observed location of the projected indicia with an actual location of the target reference point, establishing a calibration metric for the alignment of the optical projection system projection axis.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
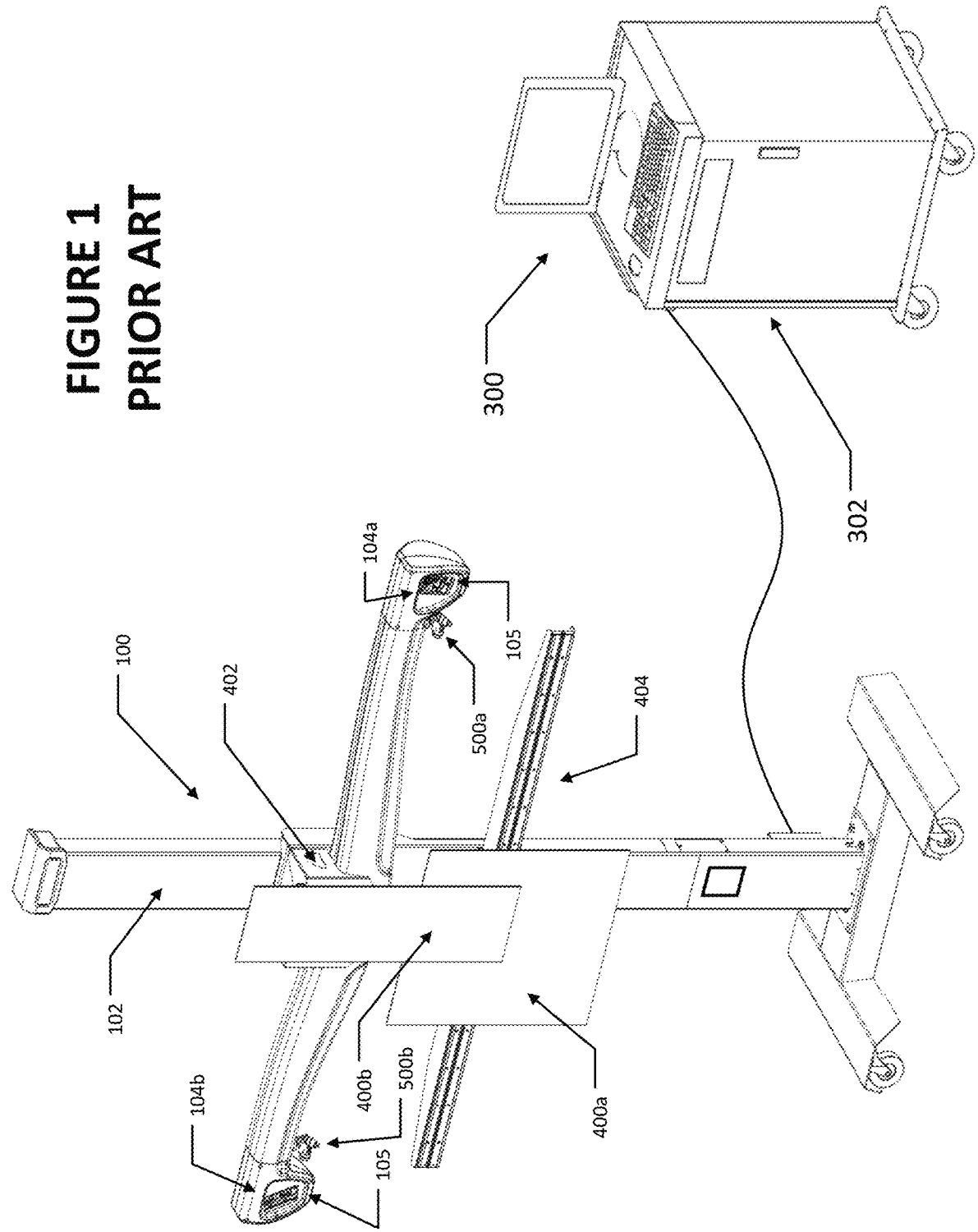
FIG. 1 is a perspective view of a prior art camera and target support structure configured with a pair of gimbal-mounted projection systems.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
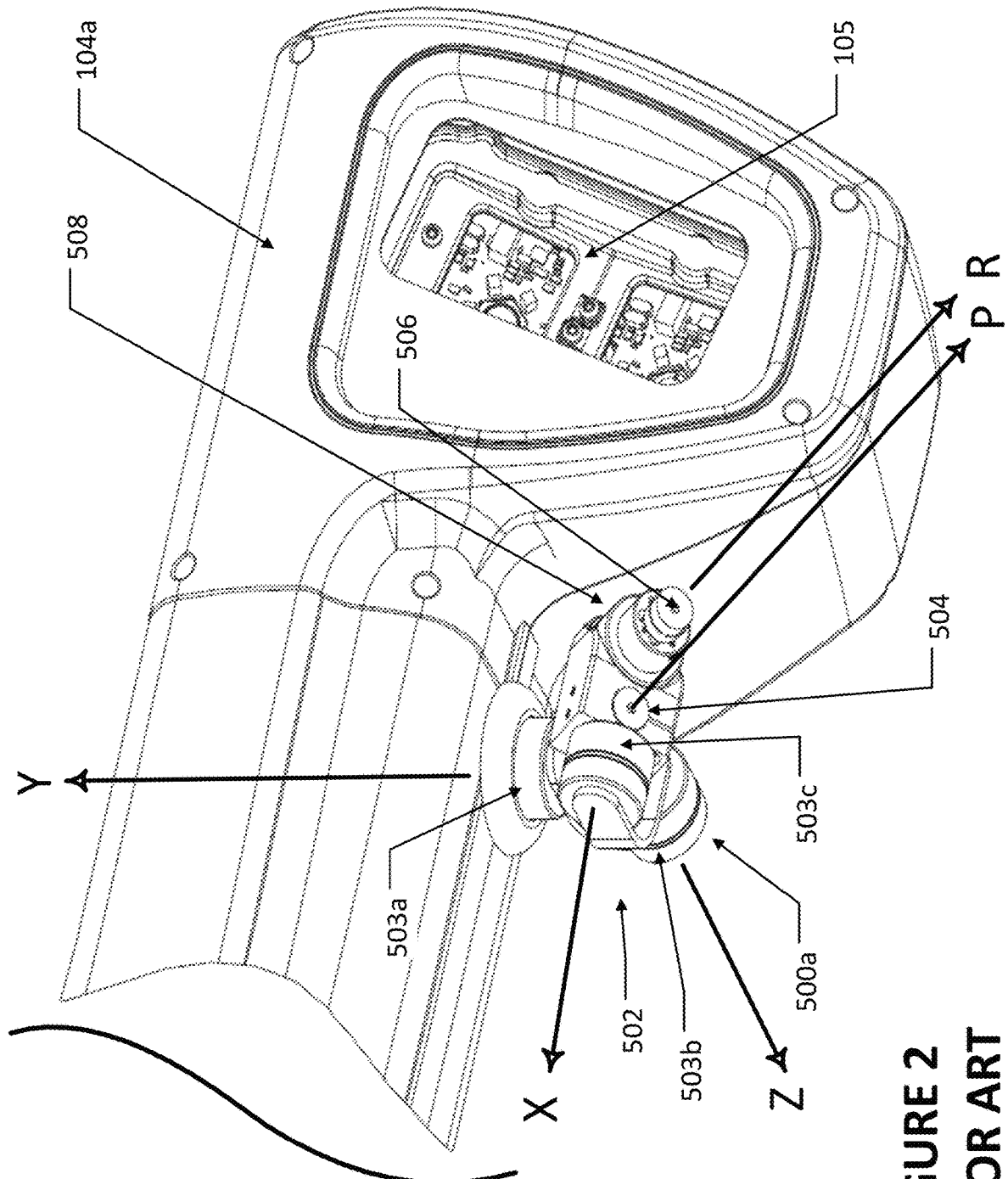
FIG. 2 is a close-up perspective view of a prior art gimbal-mounted projection system of FIG. 1 mounted to the support structure.
Figure 3:
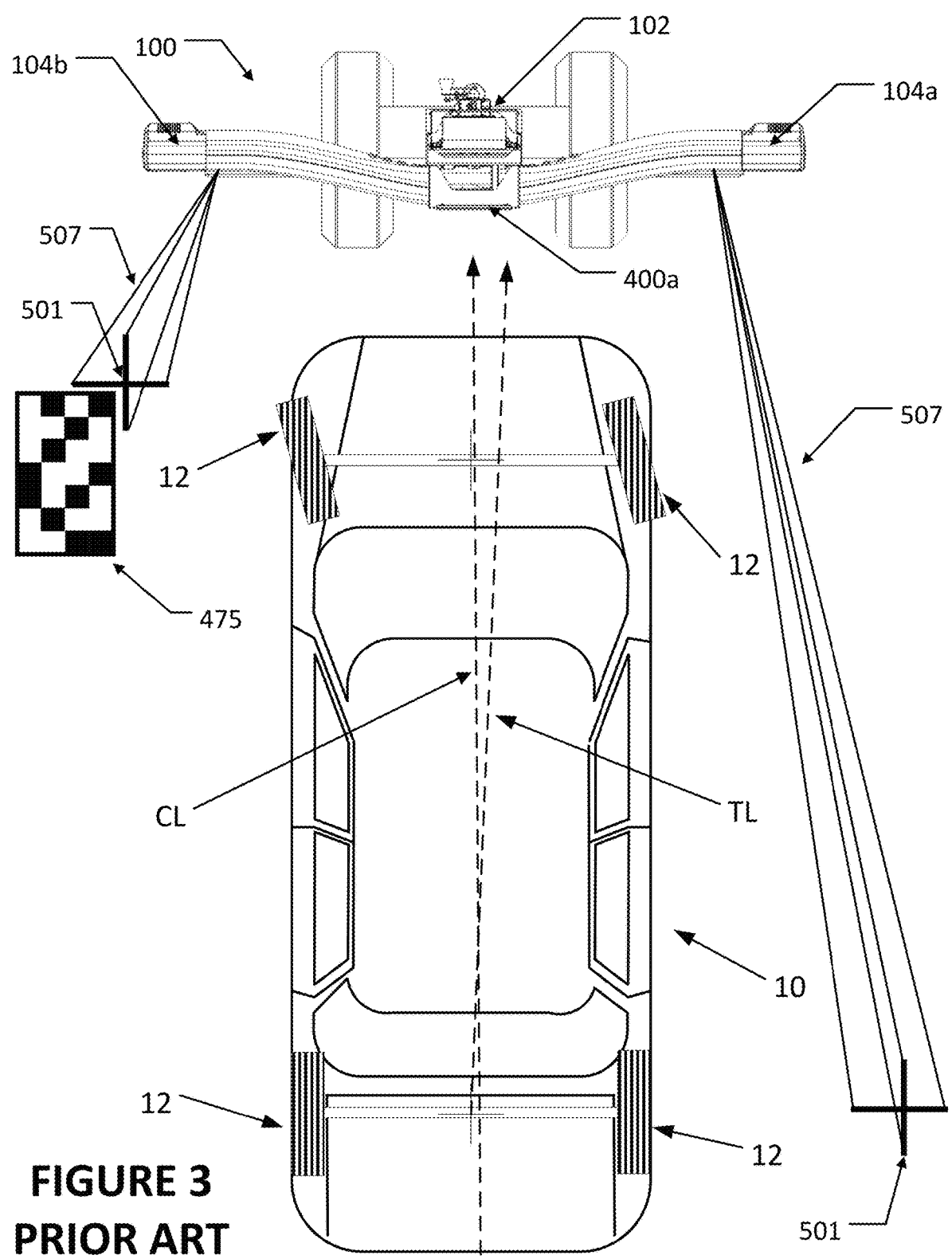
FIG. 3 is a top plan view illustrating visible indicia projected with optical projectors coupled to the gimbal-mounted guidance system of FIG. 2.
Figure 4A:
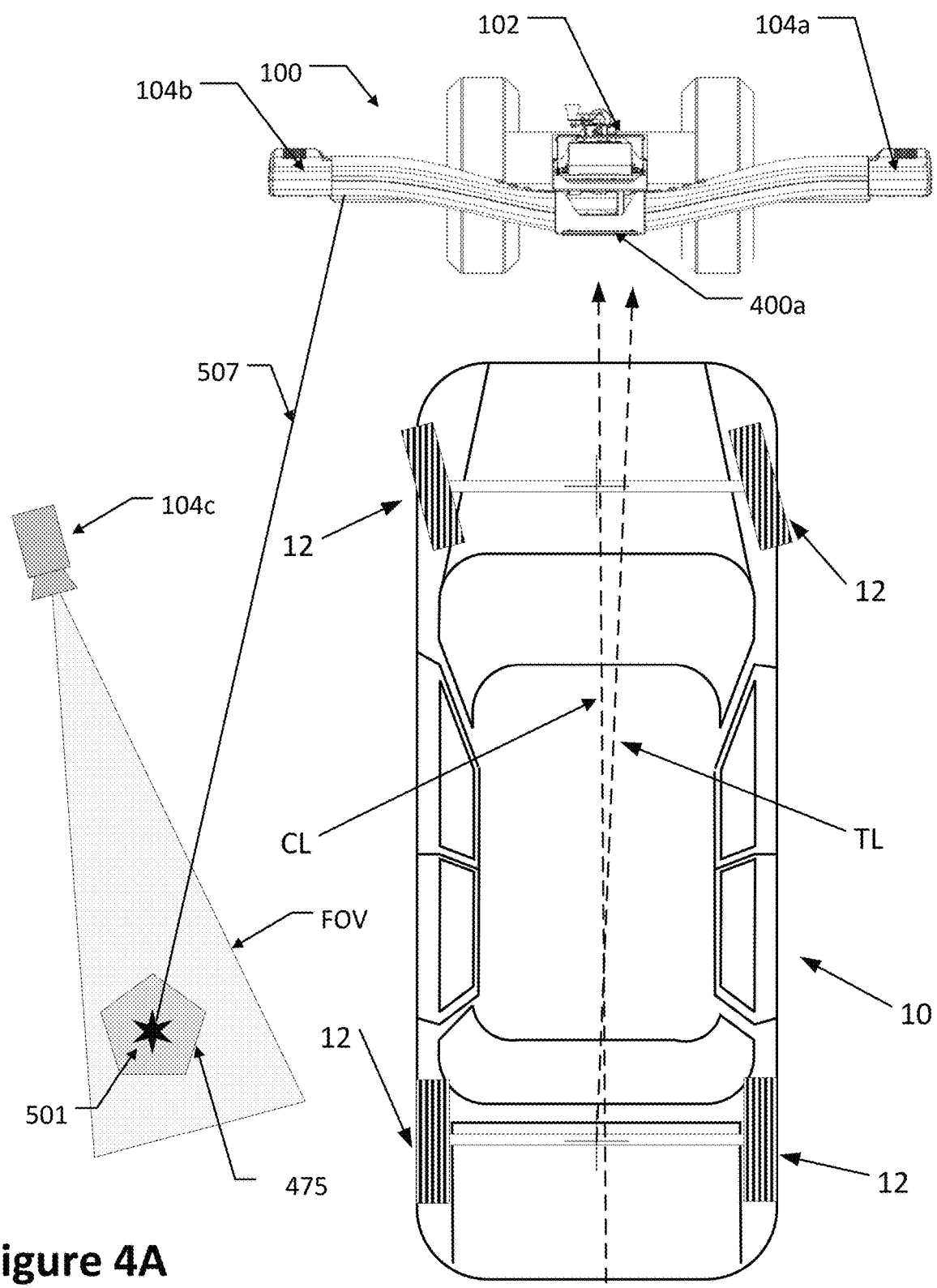
FIG. 4A is a top plan view illustrating visible indicia projected with optical projectors coupled to the gimbal-mounted guidance system of FIG. 2, modified to include an additional camera system located independent of the support structure.
Figure 4B:
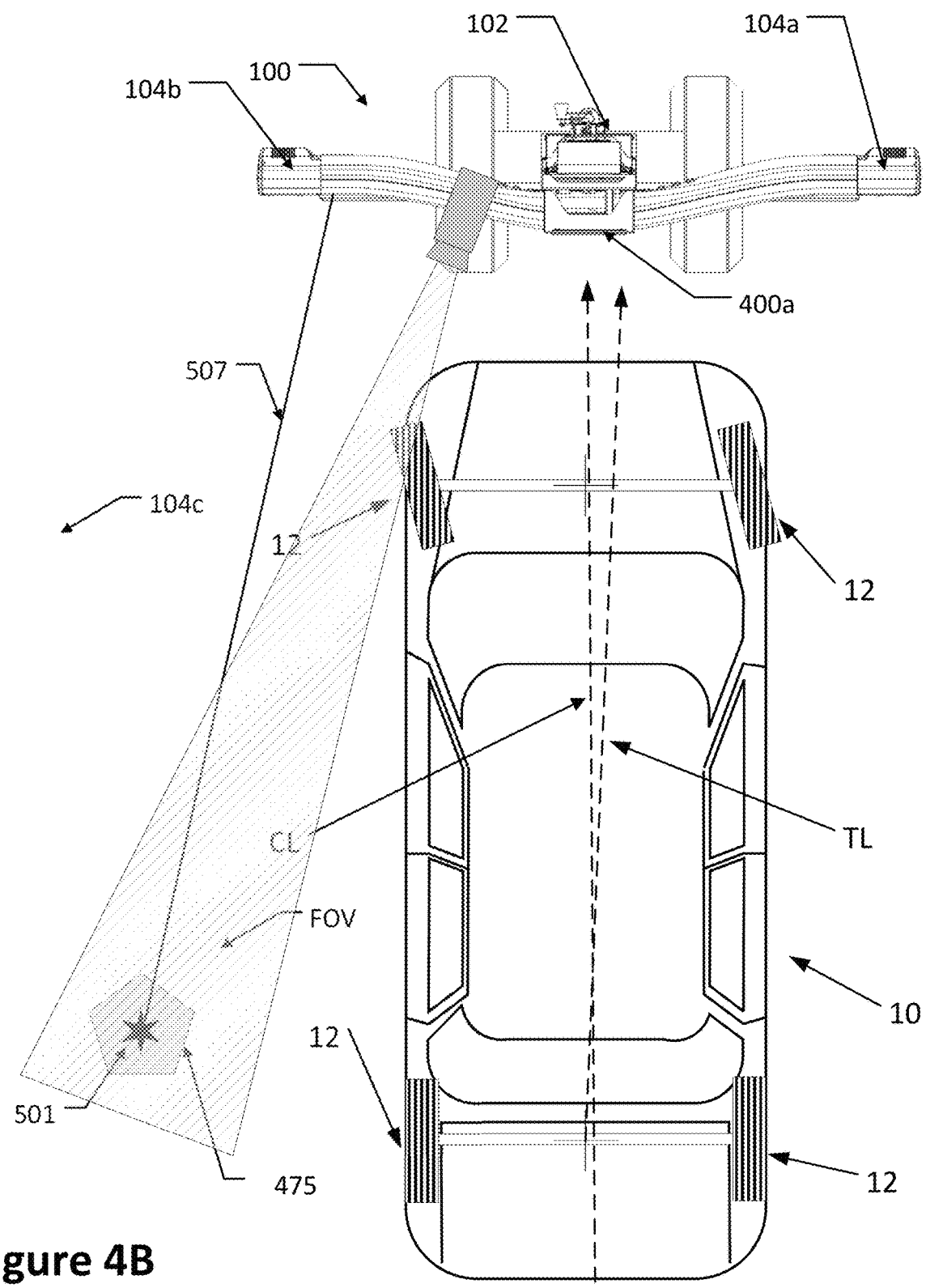
FIG. 4B is a top plan view illustrating visible indicia projected with optical projectors coupled to the gimbal-mounted guidance system of FIG. 2, modified to include an additional camera system located on the support structure.

Turning to the figures, a vehicle measurement instrumentation system 100, such as set forth and described in U.S. Pat. No. 10,634,488 B2 to Stieff et al. is shown in FIGS. 1-3, having a structure 102 supporting a set of vehicle measurement camera modules 104a, 104b and optical projectors 500a, 500b. The structure 102 may be supported by a base on the floor as shown, or secured to either a wall or ceiling by an appropriate attachment framework. Each camera module 104a, 104b contains one or more cameras 105 with fields of view oriented in a generally forward direction to observe laterally opposite sides of the vehicle 10 undergoing service. The structure 102 may optionally include components to adjust elevation and rotational of the camera modules 104a, 104b as necessary accommodate positioning of the vehicle 10, such as on an adjustable lift rack (not shown), or to accommodate changes in the placement of the system 100 relative to the vehicle 10. As seen in FIG. 4A, a separate camera module 104c containing one or more cameras 105, may optionally be mounted or positioned as needed to provide a field of view (FOV) for capturing images within the vehicle service area. The separate camera module 104c may be configured differently from the vehicle measurement camera modules 104a, 104b as required to optimize viewing of the vehicle service area, such as with different lens, resolution, etc. The separate camera module 104c may be mounted either independent of the support structure, as seen in FIG. 4A, or on the support structure, but separate from the vehicle measurement cameras 104a, 104b, as seen in FIG. 4B.

The camera modules 104a, 104b, and 104c are operatively coupled to a processing system 300, which may be disposed in an associated console 302 in proximity to the structure 102. The processing system 300 is configured with suitable logic circuit components and with software instructions for receiving image data from the camera modules 104a-c. The processing system 300 is further configured to evaluate the image data to identify relative spatial positions of observed surfaces, such as optical targets coupled to the wheels 12 or surfaces of a vehicle 10, for performing spatial transformations between various individual frames of reference, and for computing associated vehicle characteristics, such as wheel alignment angles or vehicle body position. It will be understood that the configuration of the processing system 300, camera modules 104a-c and console 302 are generally known in the art of machine vision vehicle wheel alignment systems, and may vary from the specific configuration described herein without departing from the scope of the invention. For example, the processing system 300 may be configured with software instructions to function as an interface to exchange data with one or more remote processing systems configured with software instructions to perform required calculation and/or store data, such as may be found in a cloud-based vehicle service system.

To facilitate alignment and calibration of safety system sensors onboard a vehicle 10, such as radar, LIDAR or optical sensors, the vehicle measurement instrumentation system 100 includes at least one target structure 400a and/or 400b affixed to the support structure 102, by a multi-axis mounting fixture 402. Each target structure 400a, 400b includes an observable target face oriented in a generally forward direction from the fixture or support structure 102 (i.e., towards the vehicle service area), at an elevation generally suitable for observation by the safety system sensors onboard the vehicle 10 during a realignment or recalibration procedure. The specific configuration of the target structures 400a, 400b, such as the target face features or material composition, is related to, and will be selected in accordance with, the specific type of safety system sensor for which it will be used.

The mounting fixture 402 may be a fixed mount which secures the target structures 400a, 400b in a fixed position and orientation relative to the support structure 102, or optionally, may include suitable multi-axis mechanisms under control of the processing system 300 or an operator, for adjusting the lateral position, vertical position, and/or orientation of the target structures 400a, 400b over a limited range relative to the support structure 102, as may be required for safety system sensors offset from a vehicle centerline CL or thrust line TL after the vehicle measurement instrumentation system 100 is disposed generally in front of the vehicle.

As shown in FIG. 2, the vehicle measurement instrumentation system 100 includes one or more optical projectors 500a, 500b operatively coupled to, and under control of, the processing system 300. Each optical projector is configured with a laser emitter 504 for the projection of visible indicia 501 along a projection axis P onto surfaces in proximity to the fixture or support structure. The projected visible indicia may be of any form suitable, such as an illuminated point or illuminated line. Exemplary surfaces onto which visible indicia may be projected include the vehicle 10, wheel-mounted targets 12, fixture targets, or locations on the vehicle service area surfaces. A multi-axis set 502 of motorized gimbals 503a, 503b, 503c secure each optical projector to the structure 102 for controlled rotational movement of the projection axis P about at least two orthogonal axes (X, Y, and/or Z).

The optical projectors 500a, 500b are disposed on the structure 102 so as to facilitate the projection of visible indicia onto surfaces located within the vehicle service area and adjacent each lateral side of the vehicle 10 as shown in FIG. 3. Optionally, a second laser emitter 506 is supported by an outboard gimbal motor 508 on the mounting structure 502, for rotation about a fourth axis R, enabling additional projected visible indicia, such as lines, to be rotated to visually correct for parallax distortion resulting from non-orthogonal projection orientations. The laser emitters 504 and 506 each project beams 507 of visible light through associated optical focusing elements to illuminate visible indicia in the form of spots or lines, on the surfaces. It will be recognized that the optical projectors 500a, 500b may utilized other sources of visible light, such as LED elements, and associated optical focusing elements in place of the laser emitters 504, 506 to project indicia visible to an operator and/or to an observing camera system, such as spots or points, or illumination of different colors, onto the surfaces without departing from the scope of the present disclosure. Furthermore, the specific number of axes (X, Y, Z, R) about which the optical projectors 500a, 500b are configured for movement may vary based on the intended use of the projected indicia. For example, optical projectors 500a, 500b intended to project indicia at a fixed location relative to the structure 102 may be mounted in a fixed orientation, while optical projectors which are intended to project indicia onto surfaces at varying locations relative to either the vehicle 10, vehicle measurement instrumentation system 100, or reference within the service bay, are mounted for rotational movement about multiple axes.

During operation, the processing system 300 is configured to control the multi-axis gimbal mounting structures 502 to orient each laser emitter 504 to project the observable indicia 501 at a selected location on a surface in proximity to the vehicle measurement instrumentation system 100. For example, the selected location may be determined by the processing system 300 in response to spatial measurements associated with the vehicle 10 determined from images captured by the camera modules 104, or selected to be relative to a component of the vehicle measurement instrumentation system 100, such as an axis of the support structure 102. Some vehicle safety system sensor calibration procedures require the placement of targets or fixtures 475, observable by onboard vehicle safety system sensors, at select locations within a service area relative to the vehicle. Specific placement requirements associated with safety system calibration procedures for a variety of vehicle makes and models may be stored in a database accessible to the processing system 300. Utilizing vehicle-specific recalled placement requirements, the processing system 300 operates the set 502 of motorized gimbal mounting structures to orient the optical projectors 500a, 500b to project the visible indicia 501 at the appropriate locations on the floor surface of the vehicle service area, relative to the vehicle 10 and/or the vehicle measurement instrumentation system 100, guiding an operator to place the targets or fixtures 475.

Figure 5:
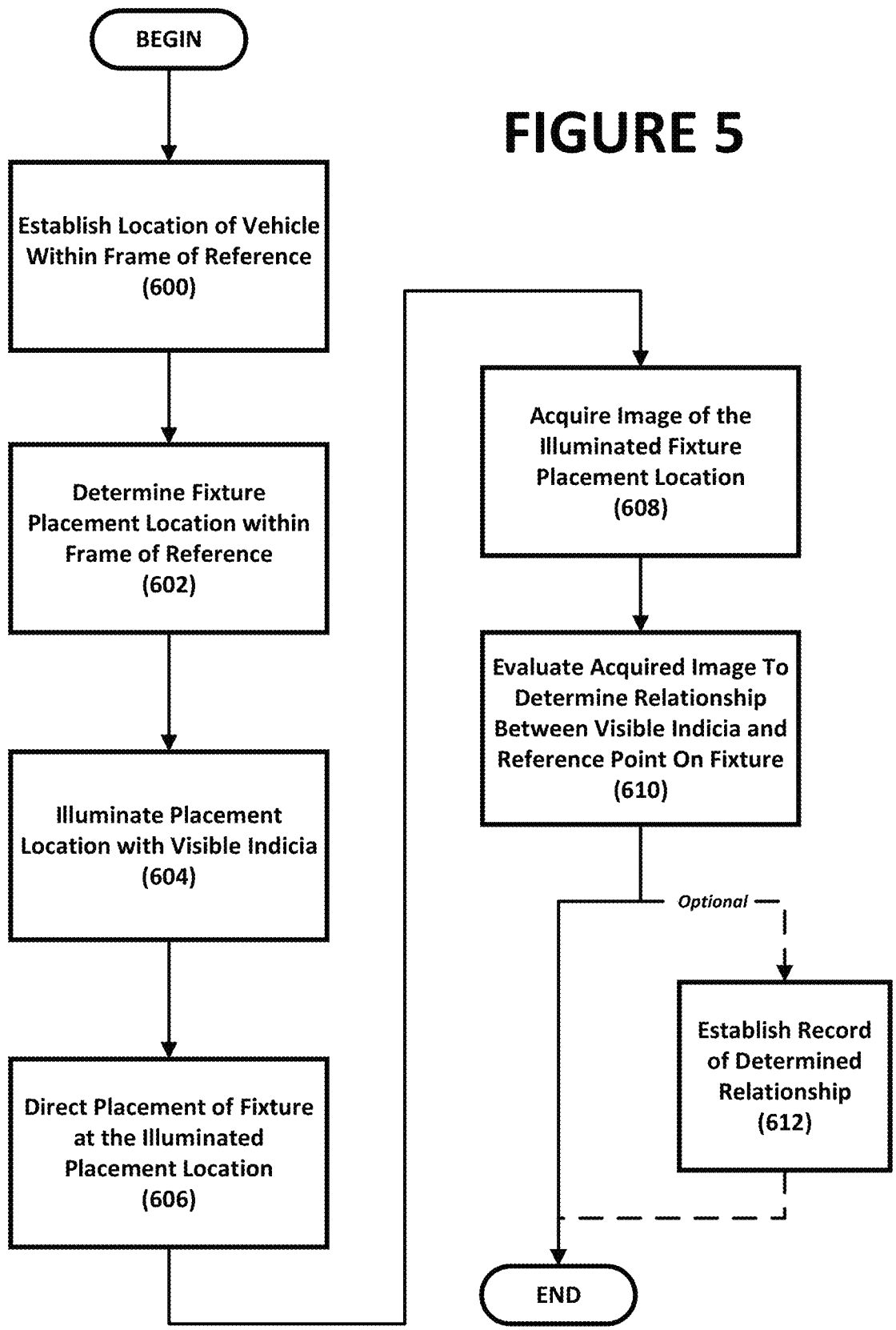
FIG. 5 is a flow chart illustrating the general steps of an embodiment of the present disclosure for target placement verification.

Proper placement of the targets or fixtures 475 can affect resulting adjustments made to the vehicle onboard safety system sensors. In order to verify that the targets or fixtures 475 have been properly placed in accordance with the requirements specific to the procedure and vehicle undergoing service, the processing system 300 is configured to perform a verification or placement confirmation procedure as illustrated generally in FIG. 5. Assuming that the targets or fixtures 475 must be placed at specified locations relative to the vehicle 10 undergoing inspection or service, the location of the vehicle within a selected frame of reference is initially established (Box 600). The target or fixture placement requirements are retrieved from an accessible database, and the corresponding locations are identified within the same selected frame of reference (Box 602). The identified locations are illuminated with visible indicia (Box 604) projected by the optical projectors 500 under control of the processing system 300. A technician is then directed to place the targets or fixtures 475 at the identified locations (Box 606). With the targets or fixtures 475 in place, the optical projectors 500*a*, 500*b* are again activated to (or continue to) project the visible indicia 501 at the designated placement locations, while the processing system 300 acquires images (Box 608) of the designated placement locations via the camera systems 104*a*, 104*b*, or 104*c*. The acquired images capture the projected visible indicia 501 together with the appropriate targets or fixtures 475. If the targets or fixtures 475 include one or more identifiable reference points, such as bulls-eye targets, or edges intended for alignment with the projected visible indicia 501, the acquired images are evaluated (Box 610) to register misalignment between the projected visible indicia 501 and the identifiable reference points. The processing system 300 optionally establishes a record of the actual placement position of the targets or fixtures 475 during a vehicle service procedure (Box 612) using the acquired images, and/or records any observed misalignment, as may be required for providing vehicle services under warranty conditions established by the vehicle OEM.

Figure 6:
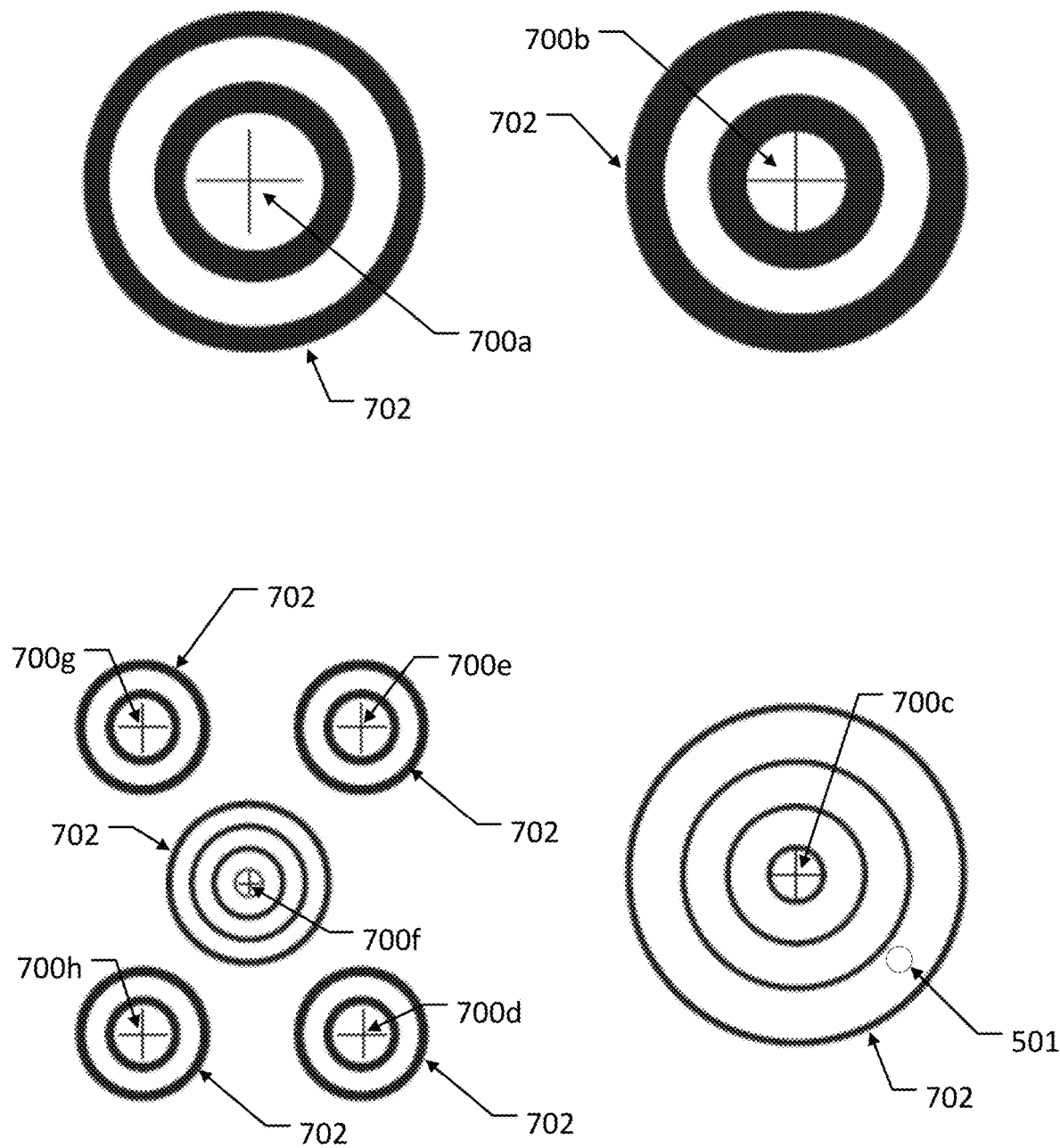
FIG. 6 is an annotated image of a set of vertically oriented targets observed by an imaging system to identify positioning accuracy of a projected laser spot.

For example, as seen in a test image shown in FIG. 6, a set of reference points 700*a*-700*h* are demarked by sets of concentric rings 702 on a vertical planar surface as might be found on a vehicle safety system target or fixture 475. The processing system 300 is configured to evaluate the acquired image, to identify at least one observable reference point (annotated in FIG. 6 with a cross), and to further identify the projected visible indicia 501 (annotated in FIG. 6 with a circle). With the observable reference points identified, together with the projected visible indicia, the processing system calculates a displacement between the projected visible indicia and one or more of the observable reference points. For the test image shown FIG. 6, reference point 700*c* (Target 3) is identified as the closest to the projected visible indicia 501, with a two-axis linear displacement of (−105, 25) denoted in image pixels between the reference point and the projected visible indicia.

Figure 7:
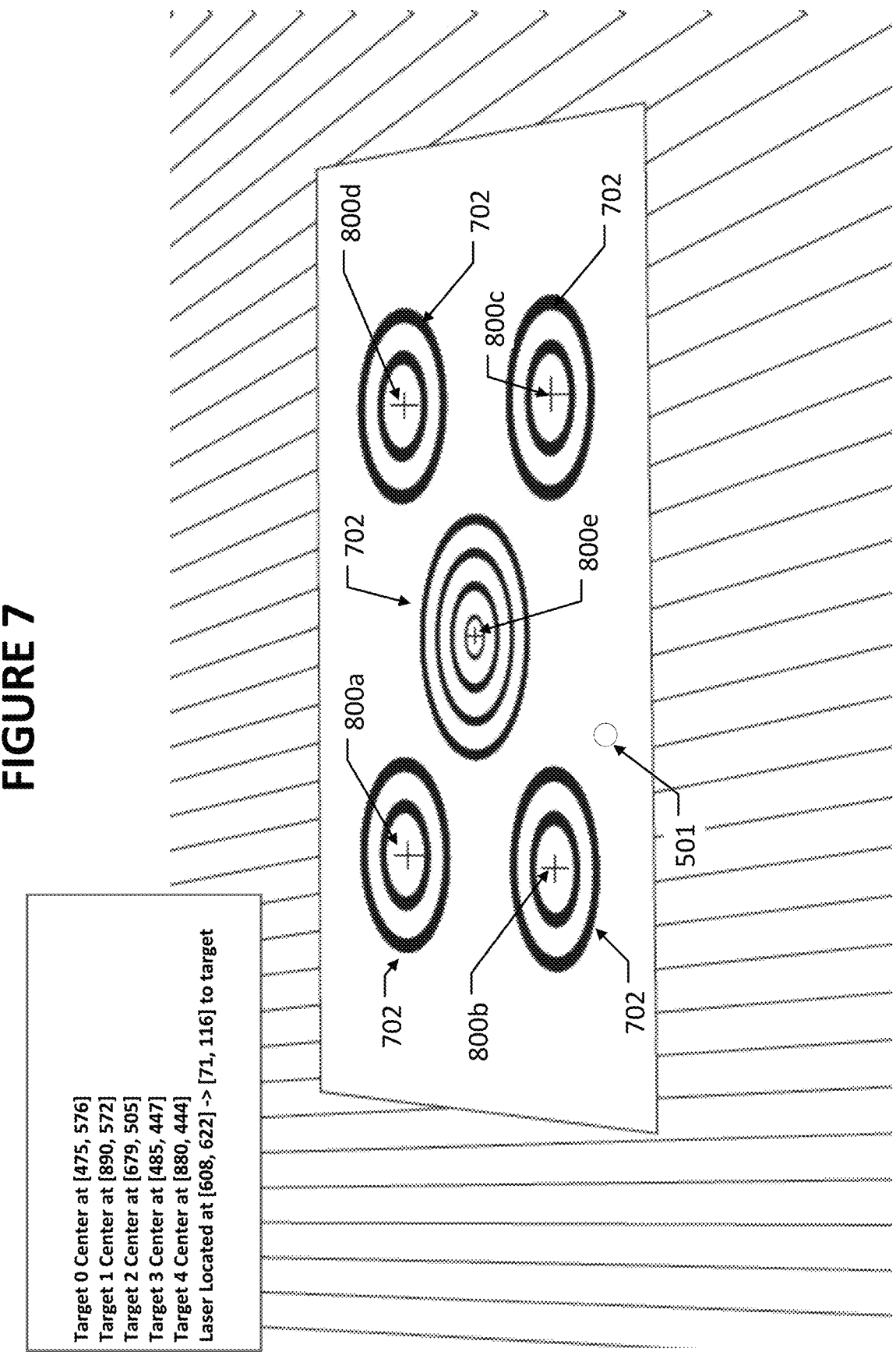
FIG. 7 is annotated images of a set of horizontally oriented targets observed by an imaging system to identify positioning accuracy of a projected laser spot.

FIG. 7 illustrates a second test image, similar to the test image of FIG. 6, with a set of reference points 800*a*-800*e* demarked by sets of concentric rings 702 on a horizontal planar surface, as might be found on the base of a vehicle safety system target or fixture 475. The processing system 300 is configured to evaluate the acquired image, to identify each observable reference point (annotated in FIG. 7 with a cross), and to further identify the projected visible indicia 501 (annotated in FIG. 7 with a circle). With the observable reference points identified, together with the projected visible indicia, the processing system calculates a displacement between the projected visible indicia and one or more of the observable reference points. For the test image shown FIG. 7, reference point 800*b* (Target 2) is identified as the closest to the projected visible indicia 501, with a two-axis linear displacement of (71, 116) denoted in image pixels between the reference point and the projected visible indicia.

In a further example, two or more observable reference points (such as on two linearly spaced targets, or at the ends of a linear feature of a single target) may be utilized with projected visible indicia in the form of a visible line. With the two or more observable reference points and the visible line present within an acquired image, the processing system calculates an orthogonal displacement between each of the reference points and the closest points of approach to the projected visible line. Using the calculated displacements, the processing system can identify an angular orientation of the projected visible line relative to a line segment defined by the two or more observable reference points. This information may, for example, be utilized to identify misplacement of floor target mats intended to be placed parallel to a vehicle or other reference line as identified by the projected visible line. Alternatively this information may be utilized to determine an orientation calibration of the projection system by evaluating the projected visible indicia relative to a linear segment defined by the two or more observable reference points.

Figure 8:
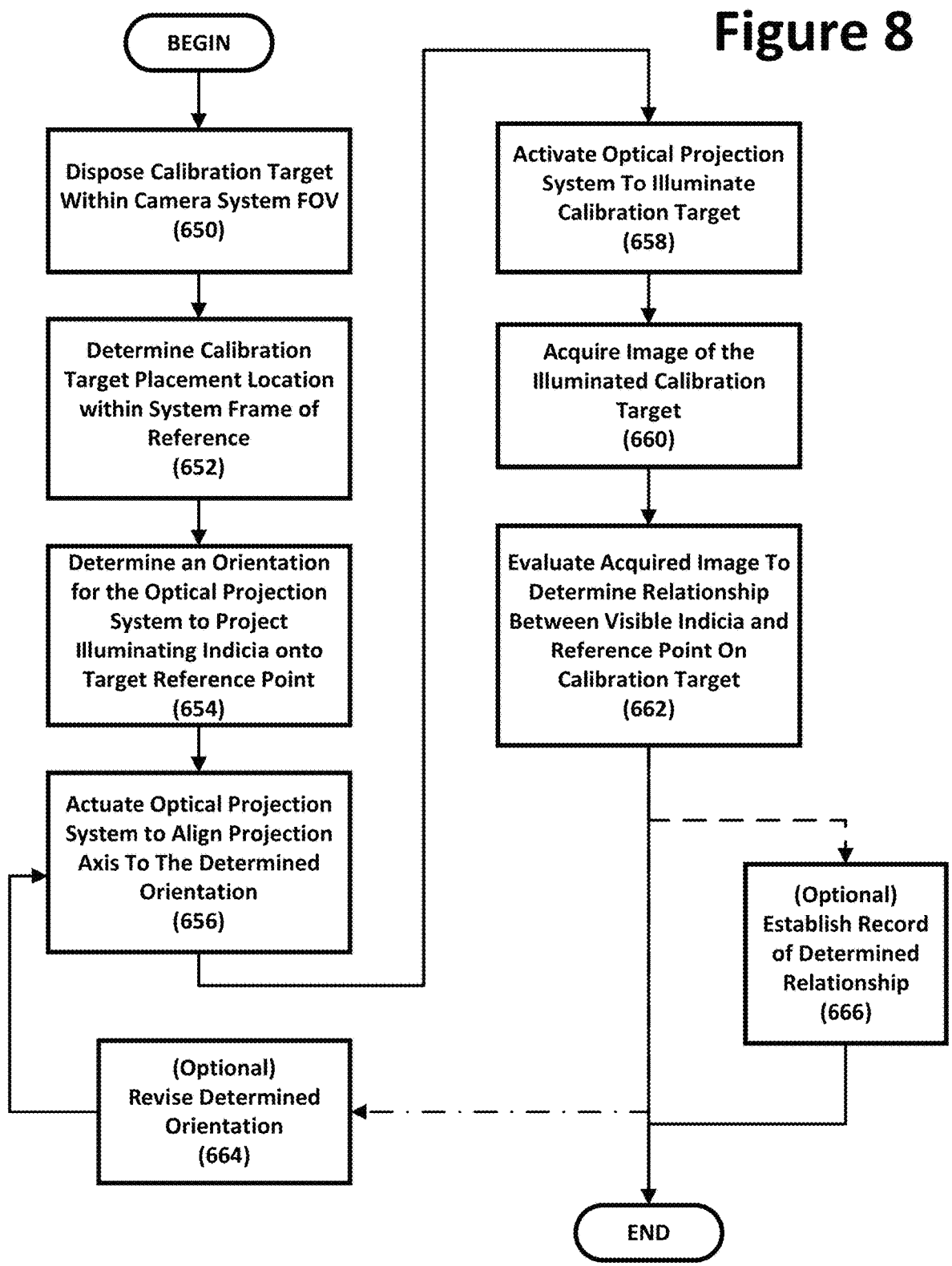
FIG. 8 is a flow chart illustrating the general steps of a further embodiment of the present disclosure.

In addition to confirming proper positioning of an external fixture or target 475, the processing system 300 may utilize acquired images to facilitate orientation calibration of the optical projectors 500*a*, 500*b*. To perform an orientation calibration, such as illustrated generally in FIG. 8, one or more calibration targets are disposed within the field of view of the camera systems 104*a*, 104*b* mounted on the structure 102 in known relationship to the optical projectors. (Box 650). Next, the processing system acquires and evaluates images of the disposed calibration targets (Box 652) in a conventional manner to identify a spatial relationship of the calibration targets relative to the support structure 102. From the established spatial relationship, the processing system 300 determines appropriate orientations for the optical projectors 500*a*, 500*b* to project visible indicia 501 onto the visible surfaces of the calibration targets (Box 654), and directs movement of the various gimbal motors to achieve the determined orientations (Box 656). Preferably, each calibration target includes an identifiable reference point 700 or linear feature serving as a calibration aiming point for the visible indicia 501 of the optical projectors 500*a*, 500*b*. With the optical projectors 500*a*, 500*b* activated (Box 658) to project the visible indicia 501, additional images of the calibration targets are acquired (Box 660) by the camera systems 104*a*, 104*b* and/or 104*c*. The processing system 300 evaluates the acquired images to confirm that the optical projectors 500*a*, 500*b* are accurately responding to commands for orientating associated projection axis towards the identifiable reference points 700 by identifying both the reference points 700 and the projected visible indicia 501 in the acquired images, and determining a relationship or displacement there between (Box 662). Observed displacements within the acquired images between the reference points 700 and the projected visible indicia 501 can be utilized as feedback (Box 664) to revise calibration of the gimbal motors for the optical projectors 500*a*, 500*b*, and/or establish a record of projector orientation accuracy (Box 666). Calibration of the gimbal motors may involve altering the commands utilized to drive the various gimbal motors to achieve an intended orientation, or the use of supplemental commands to fine-tune an orientation, as is understood in the art of motor control.

Repeating the orientation calibration process for the optical projectors 500a, 500b with the targets disposed at different locations within the field of view of the camera systems 104a, 104b enables the processing system 300 to establish a set of calibrations for the optical projectors 500a, 500b which can account for variations in the accuracy of the projection axis orientation for target surfaces at varying distances and orientations from the support structure 102.

A further embodiment of the present disclosure for use with a vehicle service system, including at least one camera 104a-c and an optical projection system 500 in a known or determinable relationship, provides a method for verifying operation of the optical projection system. Initially, one or more calibration targets are disposed within a field of view of the camera, and a spatial relationship between the vehicle measurement instrumentation system 100 and the calibration target(s) is established or determined by any suitable means. For example, the camera system 104a-c may observe the calibration target(s) position and orientation using well known image processing techniques. After identification of the spatial relationship between the calibration target(s) and the observing camera system 104a-c, an initial orientation of the optical projection system is determined which is expected to align an associated projection axis with an identified reference point on the calibration target (or a projected visible line with a linear segment defined by two or more identified reference points on the calibration targets). The reference point may be identifiable by markings or features on the calibration target(s), or by a calculated location determined to lie on a surface or along an edge of the calibration target(s).

The orientation of the optical projection system 500 is adjusted by controlled movement to the determined initial orientation, at which the optical projection system 500 is activated to project an illuminating visible indicia 501 onto a surface of the calibration target along the projection axis. For example, if the optical projection system 500 is mounted on a multi-axis gimbal arrangement 502, rotation about one or more of the individual axes (X, Y, or Z) may be selectively controlled to achieve an initial orientation. The camera system 104a-c is then utilized to acquire an image of the illuminated calibration target surface. The processing system evaluates the acquired image to determine a spatial relationship, displacement, or orientation, between the projected visible indicia 501 and the reference point. With a correctly calibration system, the projected visible indicia 501 and the reference point will be aligned on or with the target surface to within an acceptable tolerance. Spatial separation between the projected visible indicia 501 and the reference point, as represented by the determined spatial relationship, which exceeds the acceptable tolerance is utilized to generate feedback for recording a calibration or refining the controlled movement of the optical projection system 500 to reduce the observed spatial separation.

A further method of the present disclosure verifies proper operation of an adjustable optical projection system 500 associated with a camera-based vehicle measurement instrumentation system 100. Initially, a relative spatial relationship is identified between the optical projection system 500 and a selected reference point located on a surface within an operative field of view of vehicle measurement instrumentation system 100. An ideal orientation for a projection axis of the optical projection system 500 to project an illuminating beam onto the selected reference point is determined from the identified relative spatial relationship. A multi-axis mounting of the optical projection system 500 is operated to align the projection axis with the ideal orientation, and the system is activated to project an illuminating beam of light along the projection axis onto the surface. Once illuminated, the surface is observed by a camera system 104a-c to determine a displacement present between the selected reference point and an incident point of the illuminating beam of light, from which orientation feedback is generated and optionally recorded. It will be recognized that the relationship between the camera system 104a-c and the optical projection system 500 is not required to be known or determinable, so long as a determination of observed displacement can be established from the observations. The resulting orientation feedback may be representative of a deviation between an actual orientation of the projection axis following operation of the multi-axis mounting, and the determined ideal orientation.

As part of a calibration procedure for an optical projection system 500, the orientation feedback may be utilized to refine an initial ideal orientation of the projection axis, allowing the steps of operating, projecting, and observing to be repeated at least once in an attempt to reduce the observed displacement between the selected reference point and the incident point of illumination on the surface.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for verifying placement of a vehicle service fixture or target relative to a vehicle undergoing a service or inspection procedure, comprising:
   establishing a location of the vehicle within a frame of reference;
   determining a placement location for said vehicle service fixture or target relative to the vehicle within said frame of reference;
   identifying said placement location to an operator by projection of a visible indicia along a projection axis aligned with said placement location;
   directing said operator to position said vehicle service fixture or target at said identified placement location;
   verifying placement of said vehicle service fixture or target at said identified placement location by evaluating a relationship between said projected visible indicia and a reference point or feature on said vehicle service fixture or target;

wherein said reference feature on said vehicle service fixture or target is a linear reference feature;

wherein said projected visible indicia is an illuminated line; and wherein verifying placement includes determining a relationship between said illuminated line and said linear reference feature.

2. The method of claim 1 wherein said visible indicia is projected from a projection system carried by a multi-axis gimbal disposed at a known location within said reference frame, and wherein identifying said determined location includes controlling a rotational position of said multi-axis gimbal support about at least one axis to orient said projection axis of said projection system.

3. The method of claim 1 wherein verifying placement of said vehicle service fixture includes evaluating said determined relationship to identify misalignment between said illuminated line and said linear reference point or feature which exceeds a tolerance.

4. The method of claim 1 wherein verifying placement of said vehicle service fixture or target includes establishing a record of said determined relationship for association with data from said vehicle service or inspection procedure.

5. The method of claim 4 wherein establishing said record includes acquiring and storing an image capturing both said vehicle service fixture or target and said projected visible indicia.

6. The method of claim 4 wherein said established record includes a numerical representation of said determined relationship.

7. A method for verifying placement of vehicle service fixtures or targets, comprising:

determining a placement location for said vehicle service fixture or target within a frame of reference;

visibly identifying said determined placement location by projecting a light beam along a projection axis oriented to illuminate a line aligned with a reference feature of said vehicle service fixture, when said vehicle service fixture is positioned at said determined placement location;

positioning said vehicle service fixture at said visibly identified placement location;

verifying placement of said vehicle service fixture or target at said visibly identified placement location by determining a relationship between said projected illuminating light beam and said reference feature of said vehicle service fixture; and wherein said reference feature of said vehicle service fixture or target is defined by two or more linearly spaced reference points, and wherein verifying placement includes determining a relationship between said illuminated line from said projected light beam and at least one linear feature on said vehicle service fixture or target defined by said reference feature.

8. The method of claim 7 wherein determining said relationship includes calculating an orientation between said linear feature on said vehicle service fixture or target and said illuminated line.

9. The method of claim 7 wherein verifying placement of said vehicle service fixture or target includes establishing a record of said determined relationship for compilation with data from an associated vehicle service or inspection procedure.

10. The method of claim 9 wherein said established record includes acquiring an image capturing both said vehicle service fixture or target and said illuminated line.

11. The method of claim 9 wherein said established record includes a numerical representation of said determined relationship.

12. A method for verifying operation of a laser-based optical projection system of a vehicle service system, comprising:

identifying a relative spatial relationship between said laser projection system and a selected reference point located on a surface within an operative field of view for said vehicle service system;

determining an ideal orientation of a projection axis for said laser projection system to project an illuminating laser beam onto said selected reference point;

operating an adjustable mounting of said laser projection system to drive said projection axis into alignment with said ideal orientation;

projecting said illuminating laser beam along said projection axis onto said surface;

observing said surface to determine a displacement present between said selected reference point and an incident point of said illuminating laser beam on said surface;

generating orientation feedback associated with said laser projection system in response to said determined representation of displacement; and wherein observing said surface includes altering a position and/or an orientation of a camera system to encompass said surface within an image acquisition field of view;

acquiring at least one image of said surface with said camera system; and evaluating said acquired at least one image to identify said selected reference point, said incident point of said illuminating laser beam on said surface, and said displacement there between.

13. The method of claim 12 where said steps of operating, projecting, and observing are repeated at least once after refining said ideal orientation of said projection axis using said generated orientation feedback to reduce said displacement between said selected reference point and an incident point of said illuminating laser beam on said surface.

14. The method of claim 12 further including establishing a record of said generated orientation feedback.

15. The method of claim 12 wherein said generated orientation feedback is representative of a deviation between an actual orientation of said projection axis following said operation of said adjustable mounting, and said determined ideal orientation of said projection axis.

16. The method of claim 7 wherein determining said relationship includes calculating a minimum linear displacement between each of said reference points and said illuminated line; and determining, with said calculated minimum linear displacements, an angular orientation of said illuminated line relative to a line segment defined by said reference points.

17. The method of claim 16 wherein said angular orientation is representative of a placement position of said vehicle service fixture or target.

18. The method of claim 16 wherein said angular orientation is representative of an orientation calibration of a projection system for said light beam.

19. The method of claim 7 wherein said linear feature is a line segment.

20. The method of claim 7 further including acquiring an image of said visibly identified placement location following positioning of said vehicle service fixture or target; and
wherein said acquired image is evaluated to determine said relationship between said illuminated line from said projected light beam and said at least one linear feature on said vehicle service fixture or target.

\* \* \* \* \*